Oct. 8, 1929.  W. E. SHIMP  1,731,181
HOG GREASER
Filed Nov. 2, 1927
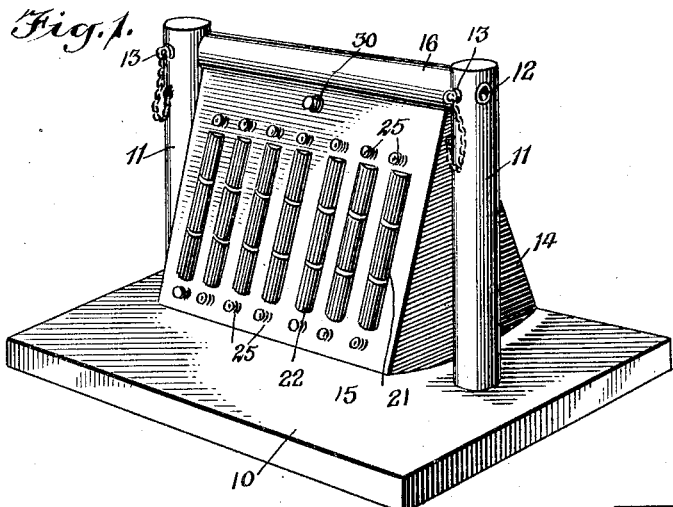
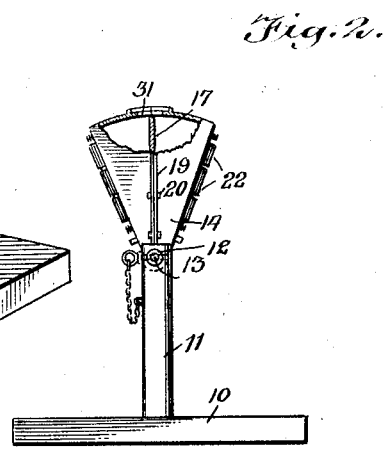
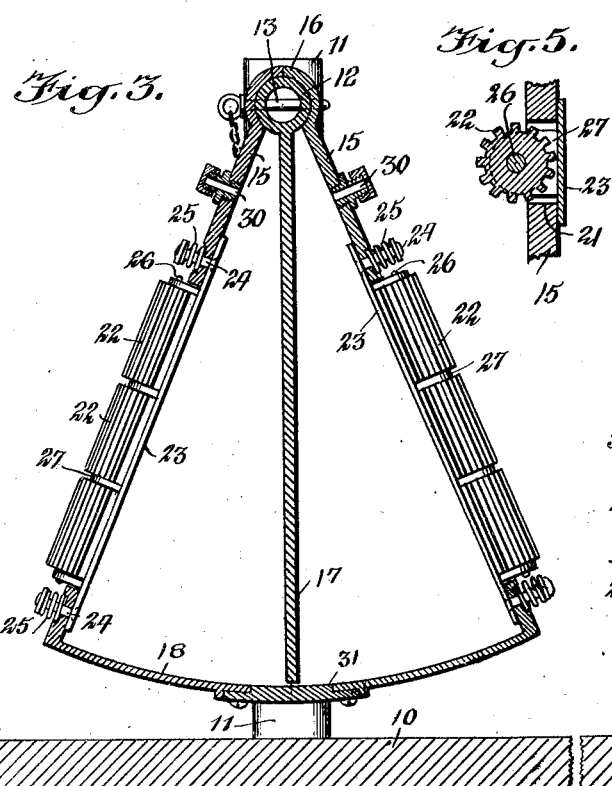
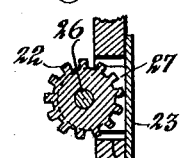
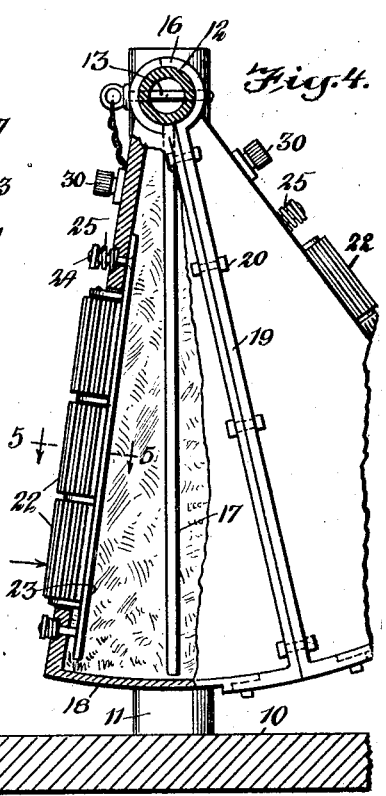
WITNESSES
INVENTOR
William E. Shimp
BY
ATTORNEY Patented Oct. 8, 1929

1,731,181

UNITED STATES PATENT OFFICE

WILLIAM E. SHIMP, OF HULL, IOWA

HOG GREASER

Application filed November 2, 1927. Serial No. 230,641.

The present invention is concerned with the provision of an apparatus for greasing hogs, particularly with a device using heavy grease against which the hogs may rub themselves and become thoroughly greased.

Objects of the invention are to provide an apparatus of this character, in which a positive feeding of grease against the bodies of the hogs is assured, and an apparatus which may be readily charged with grease.

Other objects are to provide a hog greaser which will be of simple, practical construction, yet rugged and durable in use, and well suited to the requirements of economical manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a perspective view of a hog greaser embodying the present invention.

Fig. 2 is a reduced end view thereof showing the grease chamber in inverted position for filling purposes.

Fig. 3 is a central transverse vertical sectional view through the apparatus in vertical and inoperative position.

Fig. 4 is a view partly in end elevation and partly in section, showing the grease box as swung to operative position.

Fig. 5 is a transverse sectional detail on the line 5—5 of Fig. 4.

Referring with particularity to the drawings I have used the reference numeral 10 to designate a base or platform for the apparatus. A pair of spaced posts 11 rise from the base and provide bearings for a shaft 12 which may be locked against rotation by passing pins 13 through aligned openings in the post and shaft. Suspended from, and rockable on the shaft 12 is a grease container of substantially triangular shape in cross section, and rectangular shape in longitudinal section. This grease container includes end walls 14 of sectoral shape, with their smaller ends uppermost; the edges of these walls being connected by substantially rectangular and preferably integral side plates 15. The side plates at their converging upper ends cooperatively define an approximately three-quarters circular hollow shaft 16 encircling the shaft 12 and rotatable thereabout. The extent of relative rotation of the shafts 12 and 16 is limited by a partition member 17 fixed to, and depending from the shaft 12. This partition member is engageable with the side walls 15 of the grease chamber to limit swinging movement of the grease chamber relatively to the shaft 12. The partition member serves to divide the grease chamber into two compartments, and terminates just short of the curved bottom 18 of the chamber.

Preferably the chamber is formed of two identical castings including flanged ends 19 (Fig. 4) bolted together as at 20.

The side walls 15 of the greaser are provided with a parallel series of vertical openings 21 within which batteries of grease-applying rollers 22 are mounted. The openings 21 are normally closed from the inside to prevent the escape of grease by closure plates 23. These plates carry headed studs 24 projecting outwardly through the side walls 15 of the grease compartment. Coiled expansion springs 25 encircling the studs urge the plates 23 against the interior walls of the grease compartment and normally seal the grease outlet openings 21. The rollers 22, preferably of fluted formation, are arranged in alignment on shafts 26, these shafts being journalled in bearing brackets or ears 27 projecting outwardly from the plates 23 through the openings 21. The rollers 22 project laterally beyond the outer surface of the walls 15, so that a hog may rub against them.

The grease compartment may either be filled with a grease gun through nipples 30 arranged in the upper ends of the side walls 15, or if desired, the grease compartment may be inverted as shown in Fig. 2, and grease applied through a trap 31 in the bottom 18 of the grease compartment.

The operation of the device is substantially as follows. With the parts in the position of Figs. 1 and 3, and the compartment filled with a heavy grease, the grease itself blocks relative movement of the walls 15 and partition member 17; it being borne in mind that the partition member 17 is locked in vertical position by the pins 13. When a hog rubs against either side of the device, the pressure on the rollers 22 will tend to move the plates 23 inwardly against the action of the springs 25, permitting grease to escape around the edges of the plate under the rollers. When the hog leans against either side of the apparatus, the grease within the compartment will of course be placed under pressure and will readily escape as the plates 23 move inwardly. This escaping grease filling the grooves of the fluted rollers is of course applied to the skin of the hog as the rollers are turned by the hog rubbing against them.

When it is desired to recharge the grease compartment, the pins 13 are removed, and the grease chamber and shaft 12 rotated as a unit through 90°, at which time the pins may be replaced to lock the parts in the position of Fig. 2, the cover of the trap 31 removed, and grease inserted in the chamber.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A hog greaser, including a horizontal support, a grease box having openings in the sides thereof and swingably suspended from said support, grease applying rollers arranged in said side openings, and valve means adapted to be actuated by a hog through said rollers and controlling the supply of grease from the box to the rollers.

2. A hog greaser, including a horizontal support, a grease box pendent from said support, grease applying rollers arranged in openings at the sides of the box, and valve means controlling the supply of grease from the box to the rollers, said valve means being operated by the pressure of a hog against the rollers.

3. A hog greaser, including a horizontal support, a grease box pendent from said support, grease applying rollers arranged in openings at the sides of the box, and valve means controlling the supply of grease from the box to the rollers, said valve means being operated by the pressure of a hog against the rollers, and comprising spring held plates covering the inner sides of the openings.

4. A hog greaser, including a horizontal support, a grease box pendent from said support, grease applying rollers arranged in openings at the sides of the box, and valve means controlling the supply of grease from the box to the rollers, said valve means being operated by the pressure of a hog against the rollers, and comprising spring held plates covering the inner sides of the openings, said rollers being journaled in bearings carried by said plates.

5. A hog greaser, including a horizontal support, a grease box pendent from said support, grease applying rollers arranged in openings at the sides of the box, and valve means controlling the supply of grease from the box to the rollers, and means whereby movement of the box relatively to its support compresses the grease therein, said valve being operable and said box movement being controlled by the pressure of a hog against the rollers.

6. A hog greaser, including supports, a horizontal supporting bar mounted therein and a grease box pivotally pendent from the bar, a depending partition member rigid with the bar and projecting downwardly into the box to divide the same into compartments whereby the grease in the compartment coacts with the partition member to oppose swinging of the box, said box having grease outlets at its sides.

7. A hog greaser, including supports, a horizontal supporting bar mounted therein and a grease box pivotally pendent from the bar, a depending partition member rigid with the bar and projecting downwardly into the box to divide the same into two compartments whereby the grease in the compartments coacts with the partition member to oppose swinging of the box, said box having grease outlets at its sides, said outlets comprising openings and valve plates adapted to close said openings.

8. A hog greaser, including supports, a horizontal supporting bar mounted therein and a grease box pivotally pendent from the bar, a depending partition member rigid with the bar and projecting downwardly into the box to divide the same into two compartments whereby the grease in the compartments coacts with the partition member to oppose swinging of the box, said box having grease outlets at its sides, said outlets comprising openings and valve plates adapted to close said openings, and grooved rollers in the openings for receiving grease when the valves are open and applying it to hogs rubbing against the box.

9. A hog greaser, including supports, a horizontal supporting bar mounted therein and a grease box pivotally pendent from the bar, a depending partition member rigid with the bar and projecting downwardly into the box to divide the same into two compartments whereby the grease in the compartments coacts with the partition member to oppose swinging of the box, said box having grease outlets at its sides, said outlets comprising openings and spring controlled valve plates adapted to close said openings, and grooved rollers in the openings for receiving grease when the valves are open and applying it to hogs rubbing against the box, said rollers being mounted on said plates.

10. A hog greaser, including supports, a horizontal supporting bar mounted therein, and a grease box pivotally pendent from the bar, a depending partition member rigid with the bar and projecting downwardly into the box to divide the same into two compartments whereby the grease in the compartments coacts with the partition member to oppose swinging of the box, said box having grease outlets at its sides, said box having a filling opening in its bottom, said supporting bar being rotatable in its supports to permit inversion of the box and partition and presentation of the filling opening uppermost.

11. A hog greaser, including supports, a horizontal supporting bar mounted therein, and a grease box pivotally pendent from the bar, a depending partition member rigid with the bar and projecting downwardly into the box to divide the same into two compartments whereby the grease in the compartments coacts with the partition member to oppose swinging of the box, said box having grease outlets at its sides, said box having a filling opening in its bottom, said supporting bar being rotatable in its supports to permit inversion of the box and partition and presentation of the filling opening uppermost, and means for selectively locking the supporting bar against rotation on its support.

12. A hog greaser, including supports, a horizontal supporting bar mounted therein, and a grease box pivotally pendent from the bar, a depending partition member rigid with the bar and projecting downwardly into the box to divide the same into two compartments whereby the grease in the compartments coacts with the partition member to oppose swinging of the box, said box having grease outlets at its sides, said box having a filling opening in its bottom, said supporting bar being rotatable in its supports to permit inversion of the box and partition and presentation of the filling opening uppermost, and means for selectively locking the supporting bar against rotation on its supports, said means comprising pins passed through the bar and its support.

13. A hog greaser including a horizontal support, a grease box having openings in its sides and pivotally suspended from said support, grease applying rollers arranged in said side openings, and means within the box, whereby movement of the box relatively to its support compresses the grease therein and expels it from said box to the rollers, said box movement being controlled by the pressure of a hog against the rollers.

Signed at Hull in the county of Sioux and State of Iowa this 28th day of October A. D. 1927.

WILLIAM E. SHIMP.